United States Patent
Worringer

(10) Patent No.: US 6,442,987 B1
(45) Date of Patent: Sep. 3, 2002

(54) METHOD OF PRODUCING A SHAFT FROM A PIECE OF TUBING, APPARATUS FOR MAKING A SHAFT FROM A PIECE OF TUBING AND CAMSHAFT PRODUCED FROM A PIECE OF TUBING

(76) Inventor: Josef Worringer, Voesch 56 B, 47906 Kempen (DE)

( * ) Notice: Subject to any disclaimer, the term of this patent is extended or adjusted under 35 U.S.C. 154(b) by 0 days.

(21) Appl. No.: 09/529,681
(22) PCT Filed: Sep. 18, 1998
(86) PCT No.: PCT/EP98/05963
§ 371 (c)(1),
(2), (4) Date: Apr. 14, 2000
(87) PCT Pub. No.: WO99/20414
PCT Pub. Date: Apr. 29, 1999

(30) Foreign Application Priority Data

Oct. 20, 1997 (DE) .......................... 197 45 988
Dec. 19, 1997 (DE) .......................... 197 56 673

(51) Int. Cl.$^7$ ............................................. B21D 15/06
(52) U.S. Cl. .................................. 72/58; 72/59; 72/61
(58) Field of Search ................................. 72/58, 59, 60, 72/61, 62

(56) References Cited

U.S. PATENT DOCUMENTS

| 2,892,254 A | | 6/1959 | Garvin | |
|---|---|---|---|---|
| 3,105,539 A | * | 10/1963 | Johnson | ......................... 72/59 |
| 3,704,983 A | * | 12/1972 | Tellot | ............................. 72/59 |
| 4,319,471 A | * | 3/1982 | Benteler et al. | ................ 72/59 |
| 4,763,503 A | | 8/1988 | Hughes et al. | |
| 5,058,409 A | * | 10/1991 | Washizu | .......................... 72/59 |
| 5,960,660 A | * | 10/1999 | Klaas et al. | ..................... 72/61 |
| 6,176,114 B1 | * | 1/2001 | Gmurowski | .................... 72/59 |

FOREIGN PATENT DOCUMENTS

| DE | 42 01 819 A1 | 7/1992 |
|---|---|---|
| DE | 44 27 201 A | 6/1995 |
| JP | 57 206530 A | 12/1982 |
| JP | 58 132325 A | 8/1983 |
| JP | 59 033043 A | 2/1984 |

* cited by examiner

Primary Examiner—David Jones
(74) Attorney, Agent, or Firm—Proskauer Rose LLP

(57) ABSTRACT

A method and apparatus for producing a shaft from a piece of tubing having at least one bulging portion. The method enables shafts with bulging portions to be cheaply and practicably produced. The piece of tubing bears radially against a portion adjoining the zone of the bulging portion to be produced. The piece of tubing is subjected to internal pressure which is maintained throughout the entire molding operation. The piece of tubing is acted upon by an axially operative compressive force co-operating with the internal pressure so that a portion of tubing adjoining the radially borne portion is upset so that the external diameter of the upset piece of tubing is larger than the external diameter on the unupset piece of tubing. A molding tool, having a hollow portion corresponding to the final shape of the bulging portion to be produced, is then applied to the upset piece of tubing. The bulging portion is formed by the application of radially operative compressive forces by means of the molding tool.

18 Claims, 7 Drawing Sheets

METHOD OF PRODUCING A SHAFT FROM A PIECE OF TUBING, APPARATUS FOR MAKING A SHAFT FROM A PIECE OF TUBING AND CAMSHAFT PRODUCED FROM A PIECE OF TUBING

BACKGROUND OF THE INVENTION

The invention relates to a method of producing a shaft from a piece of tubing, the shaft having at least one bulging portion such as a lifting bearing, a cam or a bearing step. The invention also relates to an apparatus for the production of such a shaft. Lastly, the invention also relates to a camshaft produced from a piece of tubing. Shafts, more particularly camshafts of the kind specified, are as a rule made from metal, more particularly steel. They are used, for example, for the reduction of engine weight, being substituted for forged or cast components intended for motor vehicles.

A multistage method of producing a camshaft, an apparatus for the performance of said method and a camshaft of the kind specified are known from U.S. Pat. No. 2,892,254. According to that specification, for the production of the known camshaft, use is made of a molding tool formed from two block-like tool halves. The surfaces of the tool halves, lying one upon the other in the closed state, are formed with cavities which jointly form a hollow mold for the bulging cam portion to be produced on the shaft. To produce the shaft by the known apparatus, first the portion of piping on which the first cam of the shaft is to be produced is laid in the tool and the piece of tubing is filled with fluid. Then the piece of tubing is sealed and by means of a suitable pressure generating device, an internal pressure is generated which is high enough to press the material of the portion of tubing in question into the hollow mold of the tool. At the same time an axial pressure is operative which encourages the material of the tubing to flow into the cavity. On completion of the first stage of molding, the tool is opened and the piece of tubing is moved axially forwards until the previously produced bulging cam portion lies in a further cavity in the tool. Then the internal pressure is built up again, a further bulging cam portion is produced, and the operation is repeated in steps, until all the cams of the shaft are finished.

It is true that the known apparatus enables a lightweight camshaft to be produced. However, practical trials carried out on camshafts produced in this way show that they failed to meet the demands on operational properties. Moreover, the production of such camshafts via the prior art methods is laborious and time-consuming. Furthermore, cams of different shapes cannot be produced on a shaft by the prior art method.

To obviate the disadvantages of the method disclosed in U.S. Pat. No. 2,892,254, the German Specification DE 44 27 201 C2 suggests the production of a preliminary mold for the cams to be made by a similar multistage cold extrusion method for the production of a camshaft. The construction of such a preliminary mold enables more material to be accumulated in the zone of the cam tip than is possible by the known method explained hereinbefore. The application of an axial compressive force to the piece of tubing ensures that supplementary material is always provided on both sides during preliminary molding, the result being a more advantageous distribution of masses of material in the zone of the particular cam. In the method known from DE 44 27 201 C2, following preliminary molding the final shape of the cams is produced in at least one further processing stage.

It is true that the method known from DE 44 27 201 C2 enables a camshaft of improved properties to be produced, but in practice it was found that even the camshafts produced by this method failed to meet the demands made on a component fully developed for serial production. Moreover, it has proved difficult to produce camshafts of suitable quality in large numbers by the method disclosed in DE 44 27 201 C2, since a large number of tools and changes of the apparatus are necessary for the performance of the method.

It is an object of the invention to provide a method and an apparatus of the kind specified which enable shafts, more particularly camshafts provided with bulging portions to be produced in a cheap and practicable manner. Another object is to provide a camshaft produced from a piece of tubing which has improved operational properties in comparison with prior art camshafts produced from pieces of tubing.

SUMMARY OF THE INVENTION

The problem stated is solved by a method of producing from a piece of piping, a shaft having at least one bulging portion such as a lifting bearing, a cam or a bearing step, wherein: the piece of tubing bears radially against a portion adjoining the zone of the bulging portion to be produced; the piece of tubing is subjected to internal pressure, by which through the co-operation of an axially operative compressive force applied to the piece of tubing, a portion of tubing adjoining the radially borne portion is so upset that the external diameter of said upset piece of tubing is larger than the external diameter on the unupset piece of tubing; then applied to the upset piece of tubing is a molding tool having a hollow portion forming a cavity corresponding to the final shape of the bulging portion to be produced; and the bulging portion is formed from the upset piece of tubing by the application of radially operative compressive forces by means of the molding tool, the piece of tubing continuing to experience internal pressure throughout the entire molding operation.

In the method according to the invention first of all, unimpeded by a molding tool, the co-operation of internal pressure and axial pressure produces an upsetting of the piece of tubing in the zone at which the particular bulging portion is to be produced. The internal pressure ensures that the collection of material caused by the upsetting leads to a widening in the diameter of the pieces of tubing in the portion in question. In the portion of tubing in question, this results in an accumulation of material which is required for the subsequent complete molding of the cam. Then the molding tool is closed. As soon as the tool contacts the upset portion, a pressure is exerted on the piece of tubing from the radial direction. This pressure imposes on the material of the piece of tubing, preferably a metal, more particularly steel, which is still under internal pressure, a particular direction of flow resulting from the shape of the tool cavity.

The special feature of the cold extrusion method according to the invention consists, as already mentioned, in the feature that the material of the tubing is not forced into any particular shape prior to the start of production of a bulging proportion, but first of all an upsetting of the material of the tubing is produced, accompanied with an accumulation of material, whose shape is not determined. Since during upsetting the material can flow freely, this ensures in a simple manner that during the production of the final shape of the bulging portion, enough material is available to prevent thinnings in the walls of the bulging portion. In this way, the method according to the invention enables a large quantity of material to be collected in a controlled manner at such places of the bulging portion as are subjected to increased loading in use, this possibility being created by a corresponding shaping of the cavity of the molding tool and by a suitable selection at the time at which the tool is applied.

Another advantage of the succession of processing steps according to the invention is that the production of shafts furnished with bulging portions can be performed on a single machine. Costly and time-consuming changes of tools or apparatuses must not be performed. The method according to the invention is therefore particularly suitable for the serial production of shafts, more particularly camshafts equipped with bulging portions for motor vehicle construction.

A particularly advantageous distribution of material in the zone of the walls of the bulging portion can be achieved by the feature that the piece of tubing is kept loaded by the axial compressive force during the molding performed by means of the molding tool. The maintenance of the axial pressure during shaping by the molding tool ensures that sufficient supplementary material is supplied to obtain the required wall thicknesses and distributions of material in the zone of the bulging portion.

A further improvement of the precision of shape reproduction can be achieved by increasing the internal pressure of the tube towards the end of the shaping process with the molding tool still applied. The result of the increase in the internal pressure of the tube during the last stage of shaping is that the material of the tube also flows reliably into those zones of the cavity of the tool which it would not reach if a constant pressure were maintained.

If a number of axially spaced-out bulging portions are to be produced in successive steps on the piece of tubing, the expense involved in the apparatus to perform the method can be minimized by the feature that the radial bearing is formed by that molding tool which has been used for the production of the bulging portion produced immediately before.

A practicable embodiment of the method according to the invention, for the production of a number of bulging portions on the piece of tubing, which also requires little expenditure on apparatus, is characterized in that the bulging portions are molded in steps, starting with that bulging portion which is associated with the front end of the piece of tubing, viewed in the operative direction of the axial compressive force. With such a method only one pressure generating device is ever required for the application of the axial and internal pressure.

If a number of bulging portions are produced on the piece of tubing, processing times can be shortened, while also keeping expenditure for apparatus low, by the feature that the piece of tubing is acted upon at both ends by an axially operative compressive force, and the bulging portions are molded in pairs, starting from the central pair of bulging portions.

In regard to the apparatus, the aforesaid problem is solved by an apparatus for producing from a piece of tubing, a shaft having at least one bulging portion, such as a lifting bearing, a cam or a bearing step, which has the following features: a bearing device adapted to engage radially around and clamp the piece of tubing, a first pressure generating device by means of which the piece of tubing can be acted upon by a compressive force in the axial direction, a second pressure generating device by means of which a pressure medium introduced into the internal space of the piece of tubing can be acted upon by pressure, and an at least singly divided molding tool which can be applied in the radial direction to the piece of tubing and which has a hollow portion forming a hollow mold corresponding to the final shape of the bulging portion to be produced. The apparatus according to the invention is particularly suitable for the performance of the method according to the invention.

The apparatus according to the invention allows the serial production from pieces of tubing by an automated process of shafts furnished with one or more bulging portions. Due to the bearing device, the piece of tubing can be so borne in a simple manner, that in the first step, the particular piece of tubing can be freely upset in a problem-free manner. The space required for the upsetting is available during this operational step, since in this phase, as they are applied radially, the parts of the molding tool are situated away from the piece of tubing. As a result, no change of tool or apparatus is needed when shafts are produced by the method according to the invention on the apparatus according to the invention.

With regard to the space required and the lateral bearing of the molding tool, conveniently, the molding tool is constructed in disc fashion. This is particularly the case if for the production of shafts having a number of bulging portions, a number of molding tools are disposed disc-fashion one beside the other axially of the apparatus. In that case, the production of the individual bulging portions of the shaft are as a rule performed in successive steps. That molding tool which was used for the production of the bulging portion made during the preceding operational step can be used as a bearing device for the next bulging portion to be produced.

The apparatus according to the invention can be produced in a simple manner if the molding tool is centrally divided.

High accuracy in the movement of the parts of the divided molding tool in relation to one another can be achieved in a simple manner by the feature that the parts of the molding tool are coupled positively to one another.

In regard to a camshaft produced by a cold extrusion method of the kind specified, the aforementioned problem is solved, in a first embodiment, by the feature that the wall thickness of the cams is at least as large as the wall thickness of the basic material from which the camshaft is made, or at least as large as the wall thickness of the wall portions situated between the cams.

A camshaft design which can be used alternatively or in addition to the aforementioned embodiments of the invention is characterized in that in the zone of the cam tips, the cams have a wall thickness which is at least as large as in the zone of the particular wall portions situated opposite the cam tips. Preferably the wall thickness in the zone of the cam tip is approximately 20% larger than the wall thickness of the wall portion opposite the cam tip.

The distribution of material provided in the camshafts according to the invention ensures that the cams, more particularly their tips, also withstand adequately and over a long enough service life even alternating high-wear loadings such as occur for example, when they are used in a private motor vehicle. This enables the expenditure for the after-processing of the camshafts according to the invention to be reduced to a minimum.

Camshafts according to the invention can be particularly advantageously produced by the method according to the invention since, as explained, the method is particularly suitable for the controlled collection of material in the zone of the cams to be produced, and more particularly in the zone of their tips.

BRIEF DESCRIPTION OF THE DRAWINGS

An embodiment of the invention will now be explained in greater detail with reference to the diagrammatic drawings, wherein.

DETAILED DESCRIPTION OF THE INVENTION

Figure 1:
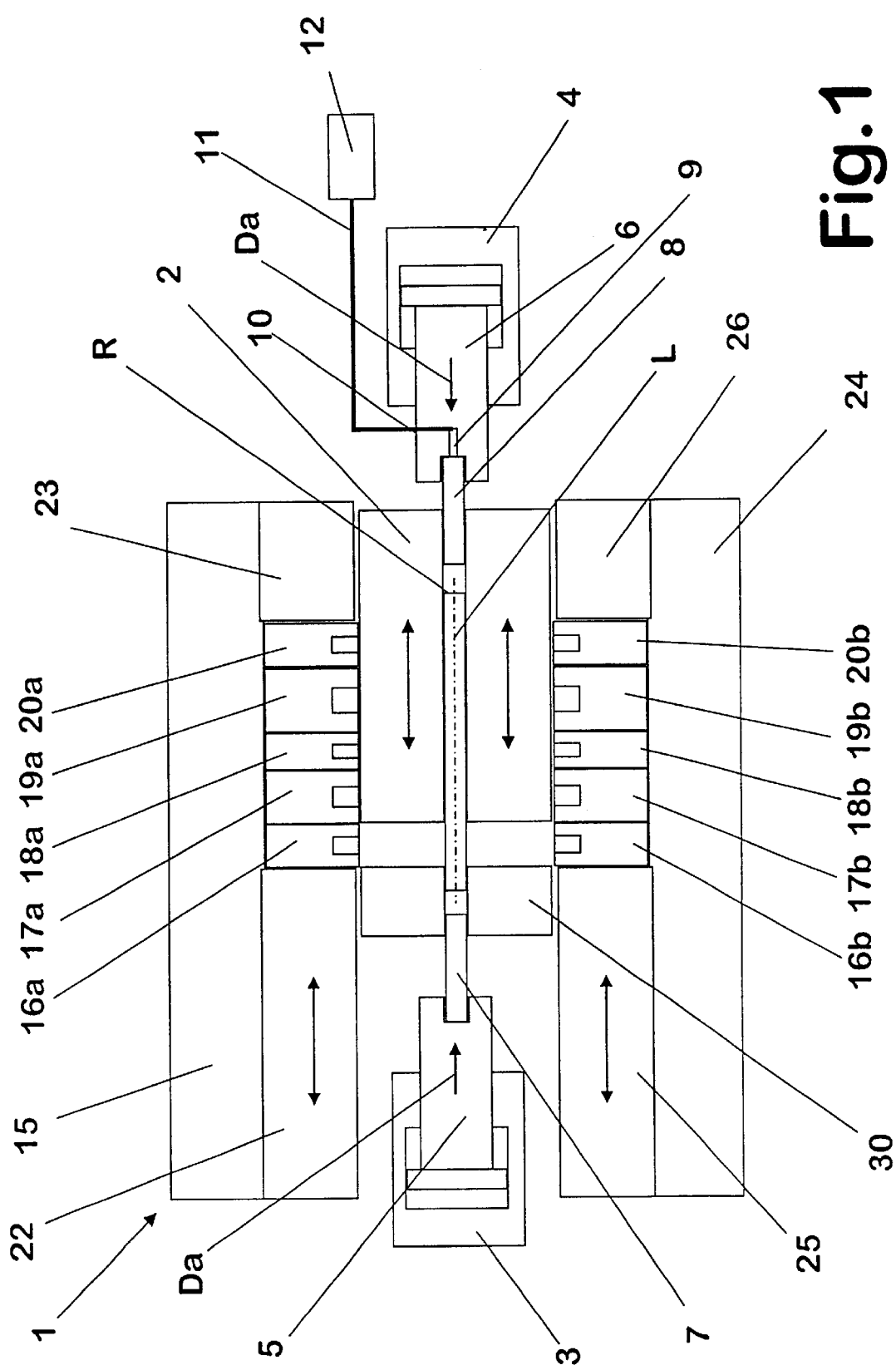
FIG. 1 is a longitudinal section through an apparatus for the production of a camshaft from a piece of tubing, in a first operational position.

Referring to the drawings, an apparatus 1 for producing a camshaft W from a piece of tubing R has a receptacle 2 in which the piece of tubing R, consisting of a steel alloy, is laid. The receptacle 2 is mounted slidably in the frame (not shown) of the apparatus 1, axis-parallel with longitudinal axis L of the piece of tubing R. Disposed coaxially of the piece of tubing R is a first hydraulic cylinder 3, a second hydraulic cylinder 4 being disposed diametrically opposite, their pistons 5, 6 bearing on pressure transmitting members 7, 8.

With the pressure transmitting members 7, 8 moved up to the piece of tubing R (FIGS. 2–4), the piece of tubing R is clamped axially between the pressure transmitting members 7, 8, so that by means of the pressure transmitting members 7, 8, the axial compressive force Da generated by the hydraulic cylinders 3, 4 acts from both their ends on the piece of tubing R. At the same time in this operational state, the pressure transmitting members 7, 8 seal off the end face openings of the piece of tubing R.

Piston 6 of the hydraulic cylinder 4 and the pressure transmitting member 8 borne thereby also have a connecting line 9 which discharges at the end face of the pressure transmitting member 8 and which is connected to a connection 10 for a pressure line 11 disposed on the generated surface of the piston 6. Via the pressure line 11 the connecting line 9 is connected to a hydraulic pump 12 through which a fluid can be introduced as pressure medium into the interior Ri of the piece of tubing R. An internal pressure Pi can be generated in the piece of tubing R by the action of the pressure of the fluid introduced into the interior Ri of the piece of tubing R.

Figure 3:
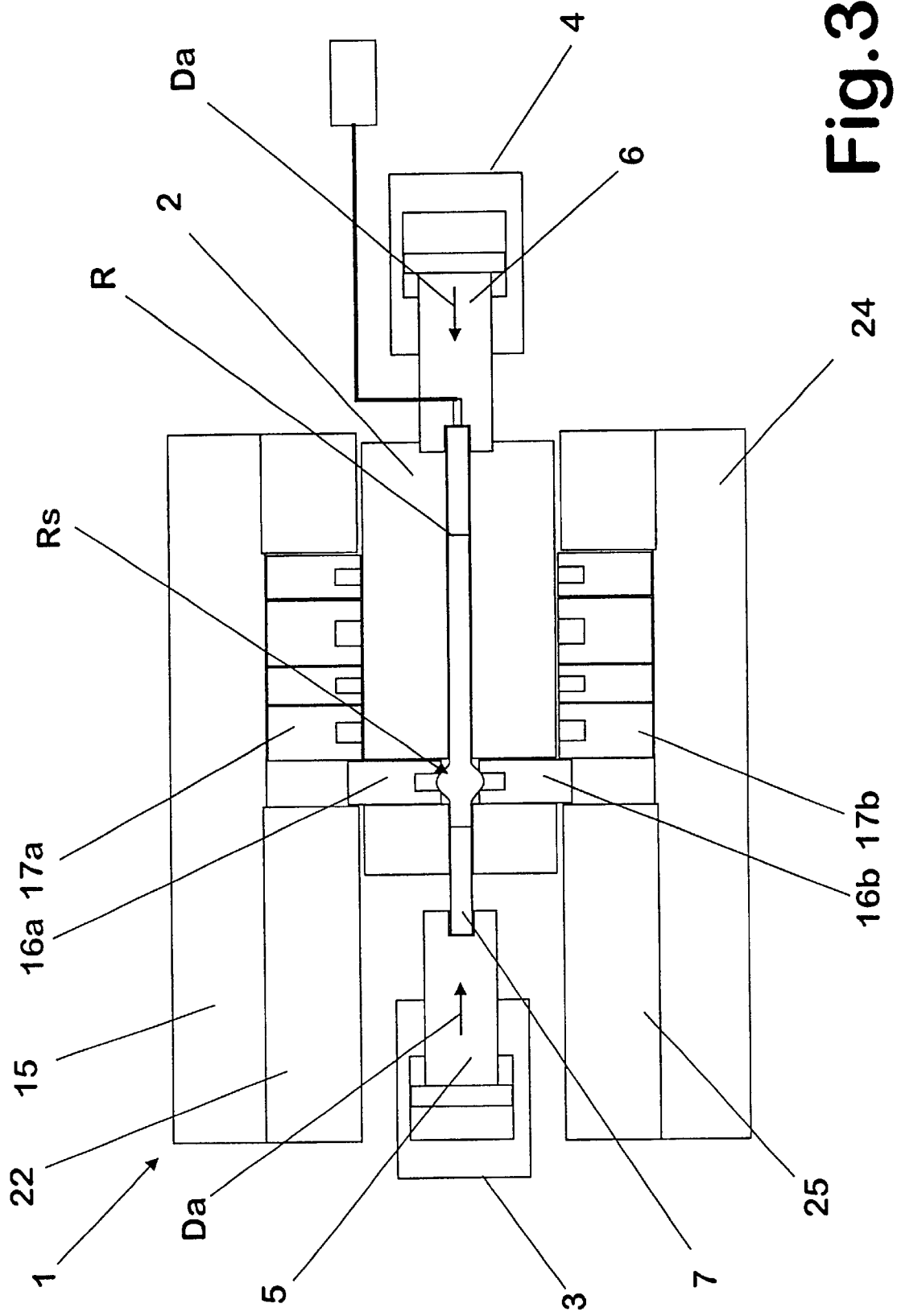
FIG. 3 is a longitudinal section through the apparatus shown in FIG. 1, in a third operational position.

Disposed in an upper adjusting device 15 of the apparatus 1 one beside the other are the upper molding halves 16a, 17a, 18a, 19a, 20a of a number of disc-shaped centrally divided molding tools which are positioned at right angles to the longitudinal axis L of the piece of tubing R. By means of adjusting elements (not shown) the molding halves 16a, 17a, 18a, 19a, 20a can be applied in the radial direction to the piece of tubing R (FIG. 3). Each molding tool half 16a, 17a, 18a, 19a, 20a has a cavity 16c whose shape corresponds to the shape of one half of each of the cams N1; N2 to be produced on the piece of tubing R. Also borne by the adjusting device 15 is a pusher 22 which is displaceable axis-parallel with the longitudinal axis L of the piece of tubing R and which in the stage shown in FIG. 1 forces the pack formed by the molding tool halves 16a, 17a, 18a, 19a, 20a against a stop 23 of the adjusting device 16.

In a corresponding manner, in the operational state shown in FIG. 1, molding tool halves 16b, 17b, 18b, 19b, 20b are forced in a bottom adjusting device 24 of the apparatus 1 by a pusher 25 against a stop 26 of the adjusting device 24. The molding tool halves 16b, 17b, 18b, 19b, 20b are constructed corresponding to the molding tool halves 16a, 17a, 18a, 19a, 20a and have cavities 19b which co-operate with the particular cavities 16c of the molding tool halves 16a, 17a, 118a, 19a, 20a to form in each case a molding cavity for the cams N1 or N2 of the camshaft which are to be produced. Just like the molding tool halves 16a, 17a, 18a, 19a, 20a, the molding tool halves 16b, 17b, 18b, 19b, 20b can be applied by means of adjusting elements (not shown) radially to the piece of tubing R.

In the operational state shown in FIG. 1, a first radial bearing of the piece of tubing R is formed by a bearing device 30 which engages radially around the end portion Re of the piece of tubing R associated with the hydraulic cylinder 3. In the operational state as shown in FIG. 1, formed between the bearing device 30 and the end face of the receptacle 2, is a free space 31 whose width corresponds to the width B of the molding tool halves 16a, 16b.

Figure 2:
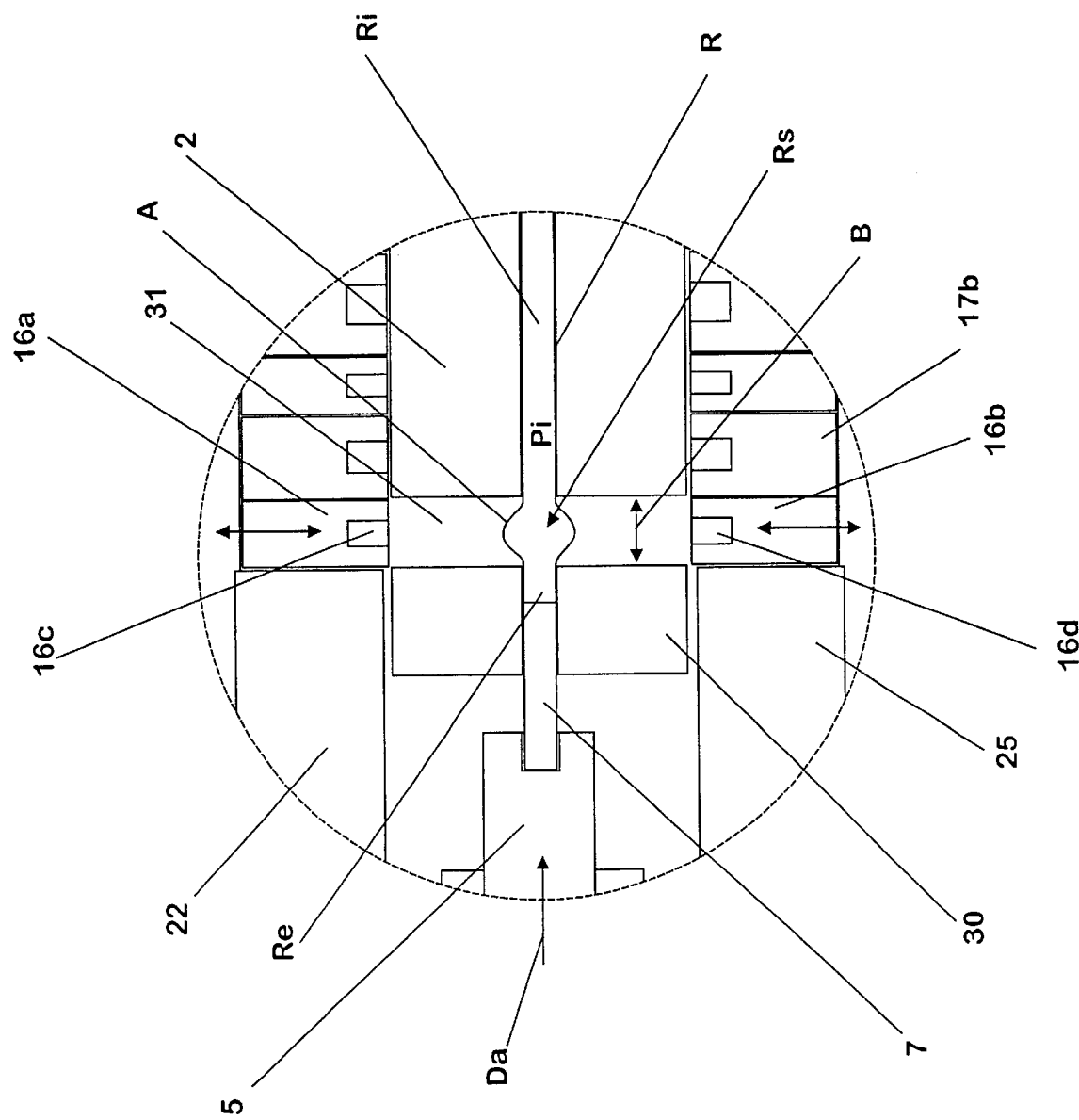
FIG. 2 is an enlarged longitudinal section through part of the apparatus shown in FIG. 1, in a second operational position.

For the production of a first cam N1 the piece of tubing R, which is under internal pressure Pi, is acted upon by the axially operative compressive force Da of the hydraulic cylinders 3, 4. This leads to the formation of an upsetting A in the free space 31 between the end face of the receptacle 2 and the bearing device 30. At the same time, the internal pressure Pi of the piece of tubing R so directs the flow of the tubing material that the diameter of the upsetting A is larger than that of the unupset piece of tubing R (FIG. 2).

Figure 4:
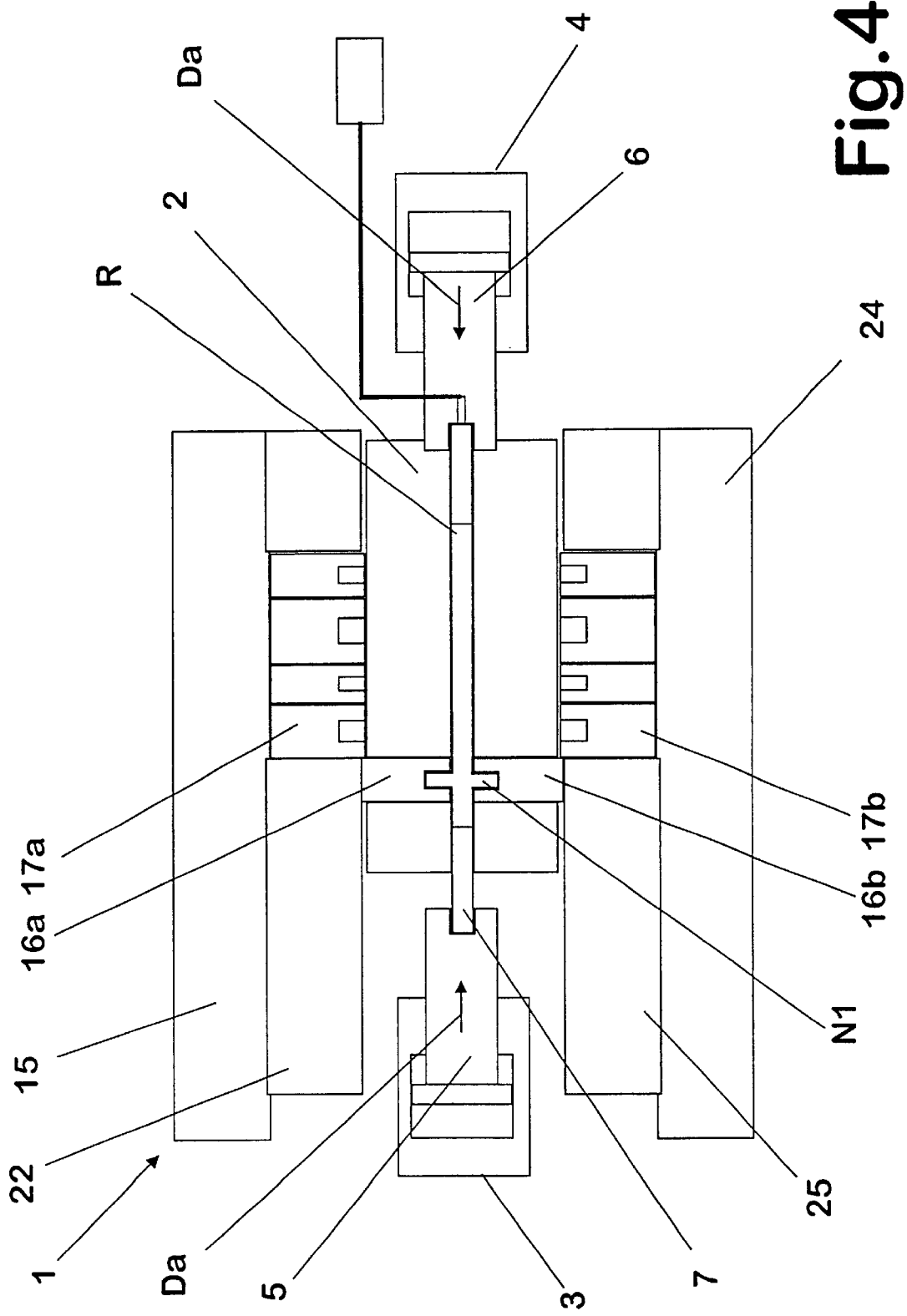
FIG. 4 is a longitudinal section through the apparatus shown in FIG. 1, in a fourth operational position.

Then the molding tool halves 16a, 16b are applied by the adjusting elements (not shown) in the radial direction to the piece of tubing R until they sit on the upset portion A (FIG. 3). When the application movement of the molding tool halves 16a, 16b is then continued, the molding tool halves 16a, 16b impose by their cavities 16c, 19b on the upset material in the zone of the portion of tubing Rs a direction of flow which leads to the upsetting A filling the hollow formed by the cavities 16c, 19b (FIG. 4).

Lastly, the molding tool halves 16a, 16b are locked in their end position by a displacement of the pusher 22, 25 in the axial direction. Then the receptacle 2 is withdrawn in the axial direction, producing a fresh free space 32 between the molding tool halves 16a, 16b. At the same time the molding tool halves 16a, 16b form a radial bearing for the piece of piping in the portion adjoining the portion in which the next cam is to be produced.

Figure 5:
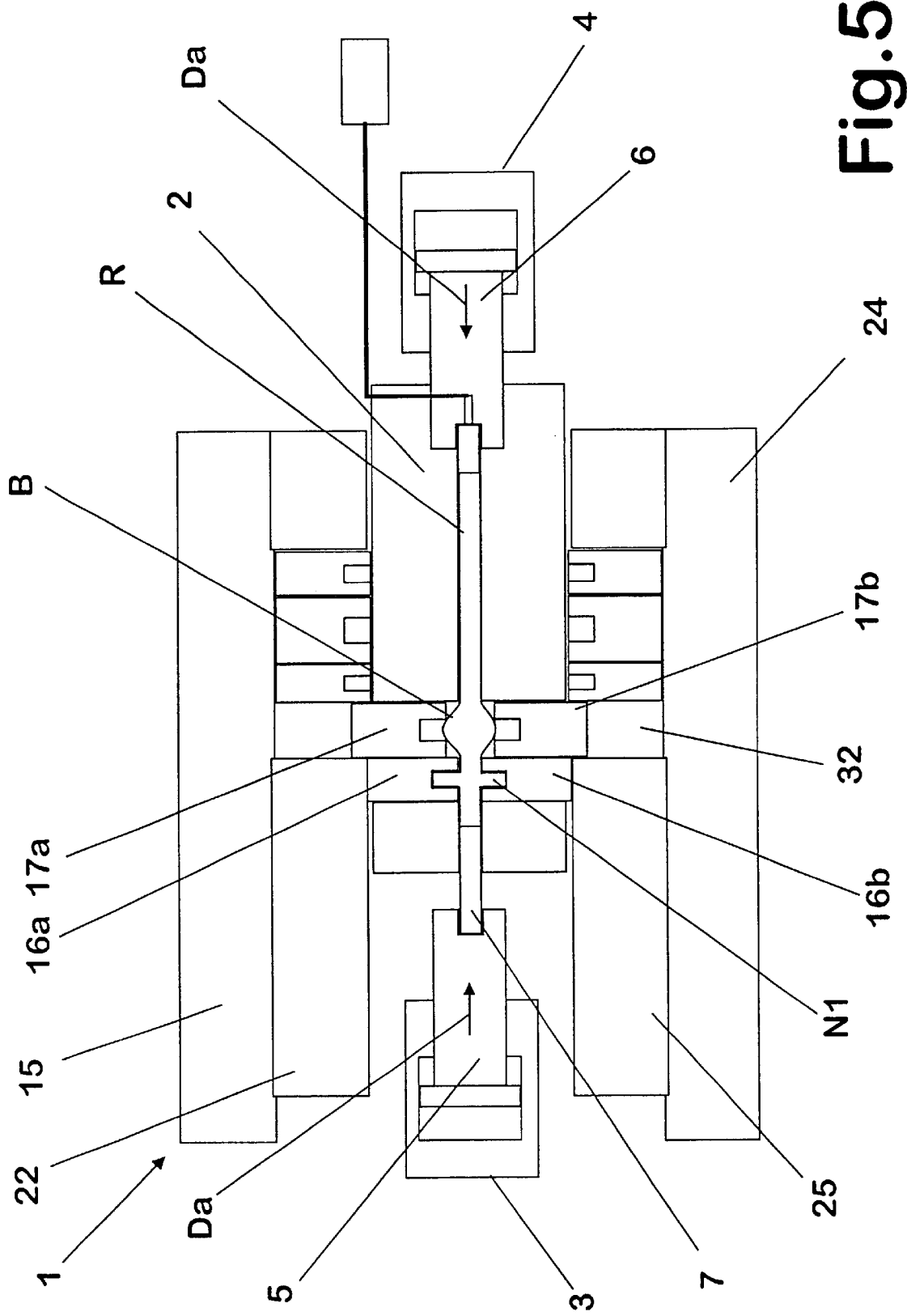
FIG. 5 is a longitudinal section through the apparatus shown in FIG. 1, in a fifth operational position.

A further upsetting B (FIG. 5) is produced in the space 32 by acting correspondingly on the piece of tubing R by an axial compressive force, the internal pressure Pi being maintained unaltered. Then the molding tool halves 17a, 17b are applied and another cam is produced in the same manner as described hereinbefore for the cam N1.

Then correspondingly the remaining cams of the particular camshaft to be produced are made. After all the molding tool halves 16a, 16b, 17a, 17b, 18a, 18b, 19a, 19b, 20a, 20b bear against the piece of tubing, the internal pressure Pi is briefly increased. As a result, the material of the tubing R also flows into those zones of the cavities 16c, 19b of the molding tool halves 16a–20b which it has hitherto not yet reached.

Figure 6:
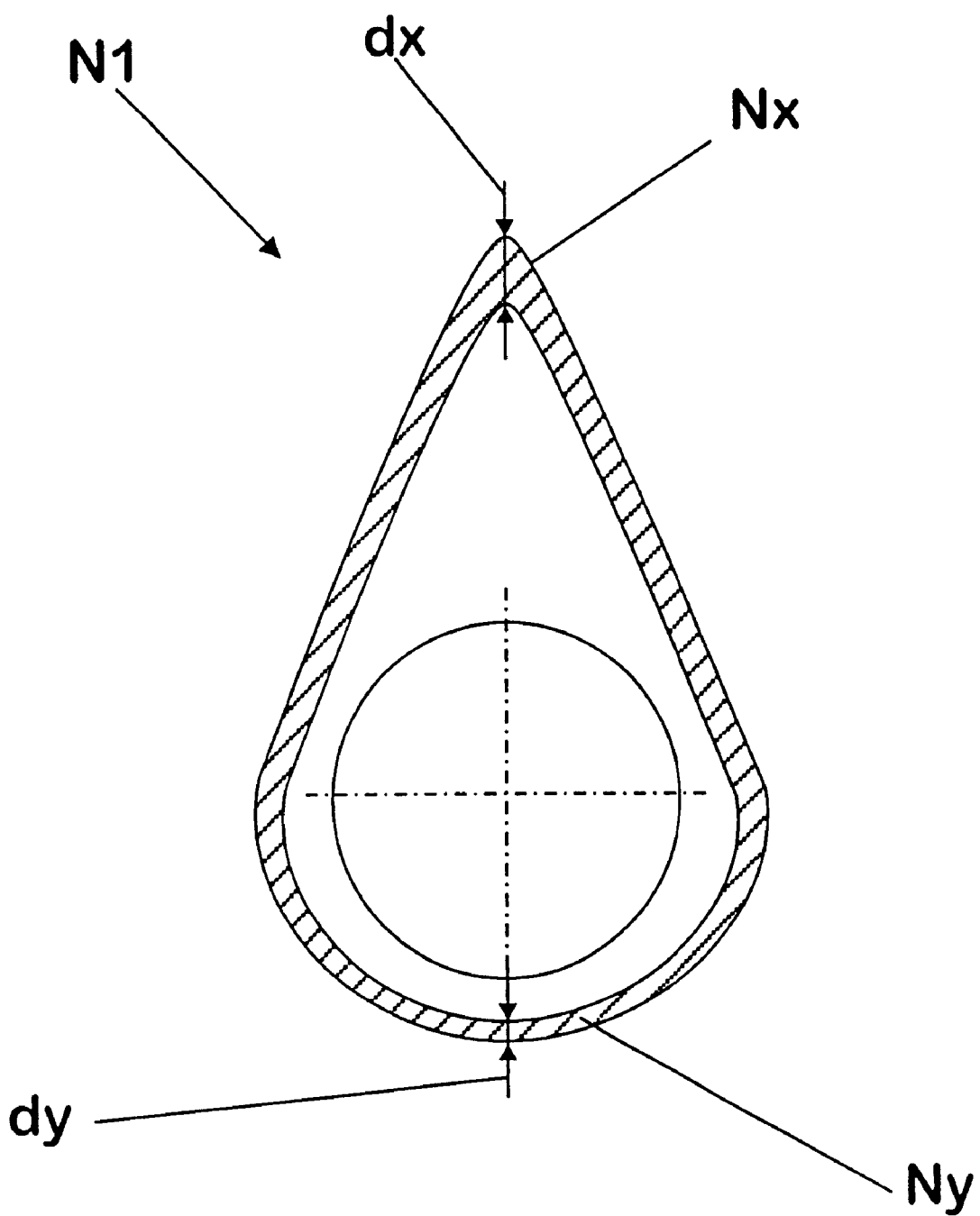
FIG. 6 is a cross-section through a camshaft.

In the zone of their cam tip Nx, the cams N1 of a first camshaft produced in the manner described have a wall thickness dx which is at least precisely as large as the wall thickness dy in the wall portion Ny opposite the cam tip nx (FIG. 6). This is achieved by a suitable selection of the shape of the cavities 16c, 19b of the molding tool halves 16a–20b, the selection of the quantity of tubing material collected in the zone of the particular portion upset, and by the selection of the time at which the particular molding tool halves 16a–20b are applied to the piece of tubing R.

Figure 7:
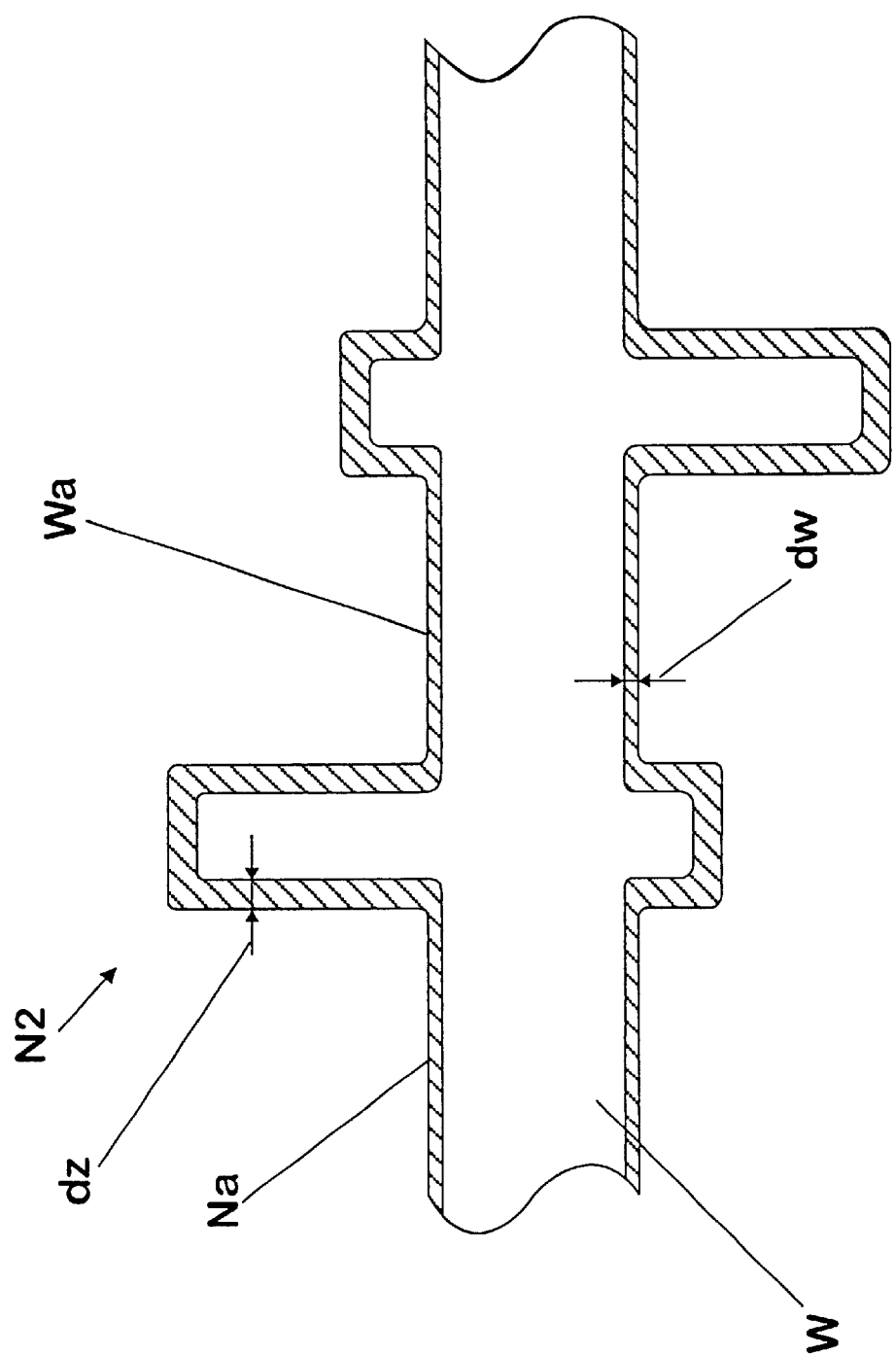
FIG. 7 is a longitudinal section through part of a second camshaft.

In the case of the second camshaft W according to the invention, shown in FIG. 7, the wall thickness dz in the zone of the cams N2 has at least exactly the same thickness as the wall thickness dw in the zone of those portions Wa which are situated between the cams N2.

What is claimed is:

1. A process for the production of a shaft, having at least one bulging portion, from a piece of tubing, comprises the steps of:

engaging a bearing device radially around the piece of tubing, subjecting the piece of tubing to internal pressure, the internal pressure being maintained throughout the process, applying an axially operative compressive force to the piece of tubing so that in cooperation with the internal pressure, a portion of the piece of tubing which is engaged by the bearing device is upset so that an external diameter of the upset portion of the piece of tubing is larger than an external diameter of an unupset piece of tubing, applying a molding tool to the upset portion of the piece of tubing, the molding tool having a hollow portion forming a cavity corresponding to a final shape of the at least one bulging portion to be produced, and molding the at least one bulging portion by applying a radially operative compressive force to the upset portion of the piece of tubing by means of the molding tool.

2. The process according to claim 1, herein the piece of tubing is held in position by the axially operative compressive force during the molding step.

3. The process according to claim 1, wherein the internal pressure of the piece of tubing is increased at the end of the molding step, and wherein the molding tool bears against the piece of tubing.

4. The process according to claim 1, wherein a plurality of bulging portions are produced on the piece of tubing in successive steps, and wherein the bearing device is the molding tool which has been used in production of a previously formed bulging portion.

5. The process according to claim 1, wherein a plurality of bulging portions are produced on the piece of tubing, the plurality of bulging portions being molded in successive steps, beginning with a bulging portion associated with a front end of the piece of tubing, viewed in an operative direction of the axial compressive force.

6. The process according to claim 1, wherein a plurality of bulging portions are produced on the piece of tubing, wherein the piece of tubing is acted upon at two opposing ends by an axially operative compressive force, and the plurality of bulging portions being molded in pairs, beginning from a pair of bulging portions centrally located on the piece of tubing.

7. The process according to claim 1, wherein the at least one bulging portion is a lifting bearing.

8. The process according to claim 1, wherein the at least one bulging portion is a cam.

9. The process according to claim 1, wherein the at least one bulging portion is a bearing step.

10. An apparatus for the production of a shaft, having at least one bulging portion from a piece of tubing, comprising:

a bearing device engaged radially around and clamping the piece of tubing, a first pressure generating device for applying a compressive force to the piece of tubing in the axial direction, a second pressure generating device for applying pressure to a pressure medium introduced into an internal space of the piece of tubing, and an at least singly divided molding tool for application in the radial direction to the piece of tubing, the molding tool having a hollow portion forming a hollow mold corresponding to a final shape of the at least one bulging portion to be produced.

11. The apparatus according to claim 10, wherein the molding tool is disc-shaped.

12. The apparatus according to claim 10, wherein a plurality of molding tools are disposed serially in the axial direction of the apparatus.

13. The apparatus according to claim 12, wherein the plurality of molding tools form the bearing device.

14. The apparatus according to claim 10, wherein the molding tool is centrally divided.

15. The apparatus according to claim 10, wherein at least singly divided parts of the molding tool are coupled positively to one another.

16. The apparatus according to claim 10, wherein the at least one bulging portion is a lifting bearing.

17. The apparatus according to claim 10, wherein the at least one bulging portion is a cam.

18. The apparatus according to claim 10, wherein the at least one bulging portion is a bearing step.

* * * * *